US007029192B2

(12) United States Patent
Tsang

(10) Patent No.: US 7,029,192 B2
(45) Date of Patent: Apr. 18, 2006

(54) SOUND PRODUCING CRAYON

(75) Inventor: Henry H. T. Tsang, Richmond Hill (CA)

(73) Assignee: Laurie Verrelli, Quebec (CA)

( * ) Notice: Subject to any disclaimer, the term of this patent is extended or adjusted under 35 U.S.C. 154(b) by 0 days.

(21) Appl. No.: 10/774,425

(22) Filed: Feb. 10, 2004

(65) Prior Publication Data

US 2005/0175392 A1 Aug. 11, 2005

(51) Int. Cl.
*B43K 25/00* (2006.01)
*G09B 11/00* (2006.01)

(52) U.S. Cl. ............................ 401/52; 401/49; 434/81; 434/84

(58) Field of Classification Search .................. 401/49, 401/52, 195; 434/81, 84, 391
See application file for complete search history.

(56) References Cited

U.S. PATENT DOCUMENTS

2004/0180310 A1* 9/2004 Lee

* cited by examiner

*Primary Examiner*—David J. Walczak
(74) *Attorney, Agent, or Firm*—Merchant & Gould P.C.

(57) ABSTRACT

A set of crayons each having at least one characterizing physical property which differs from other crayons in the set such as color, size, shape, or fragrance have identifying terminations corresponding to the physical property. A universal decoder is provided in a sound emitting device which is adapted to produce an audible tone or message that corresponds to a physical property. Preferably the sound emitting device will include an integrated circuit, microprocessor and speaker components. The sound emitting device may be integral with the crayon. Preferably, the sound emitting device is separable from the crayons and may be physically or electrically coupled to a crayon by the user when a crayon is selected. Alternatively, a sound emitting device is provided which is operational when remote from a selected crayon.

2 Claims, 4 Drawing Sheets

SOUND PRODUCING CRAYON

FIELD OF THE INVENTION

This invention relates to crayons of the kind used by children to draw pictures and commonly made of coloured wax material and to other such writing instruments.

BACKGROUND OF THE INVENTION

It has been observed that young children will often draw pictures using a single colour without any apparent selection of the colour or any apparent discrimination between colours. For example, an entire person might be drawn using the colour green. Thus the head, legs, body and arms are all drawn in the colour green. At early stages of development, a child will not associate the colour blue with the sky, the colour yellow with a banana or the colour red with strawberries. The colour of the crayon selected by the child to draw a picture has no apparent significance or relationship to the objects being drawn even when the child has a full box of crayons of varying shades and colours available.

An object of this invention is to provide audible means for discriminating between crayons having different colours.

SUMMARY OF THE INVENTION

In accordance with this invention, there is provided a set of crayons each having at least one characterizing physical property which differs from other crayons in the set. The physical property may, for example, be a colour, size, shape, or fragrance. Each crayon has an identifying termination corresponding to said at least one characterizing physical property and a universal decoder is provided in a sound emitting device which is adapted to produce an audible tone or message that corresponds to the said at least one characterizing property.

Preferably the sound emitting device will include an integrated circuit, microprocessor and speaker components. The sound emitting device may be integral with the crayon. Preferably, the sound emitting device is separable from the crayons and may be physically or electrically coupled to a crayon by the user when a crayon is selected in order for the universal decoder to operate. Alternatively, a sound emitting device is provided which is operational when remote from a selected crayon.

BRIEF DESCRIPTION OF THE DRAWINGS

In order that the invention may be more clearly understood, reference will be made to the accompanying drawings, in which:

FIG. 1(*b*) is a perspective view of the assembly of FIG. 1(*a*);

FIG. 3(*b*) is an exploded view of a crayon and sound emitting device assembly according to a second embodiment of the invention;

FIG. 4(*b*) is an exploded view of a crayon and sound emitting device assembly according to a third embodiment of the invention.

DESCRIPTION OF PREFERRED EMBODIMENT WITH REFERENCE TO DRAWINGS

Figure 1:
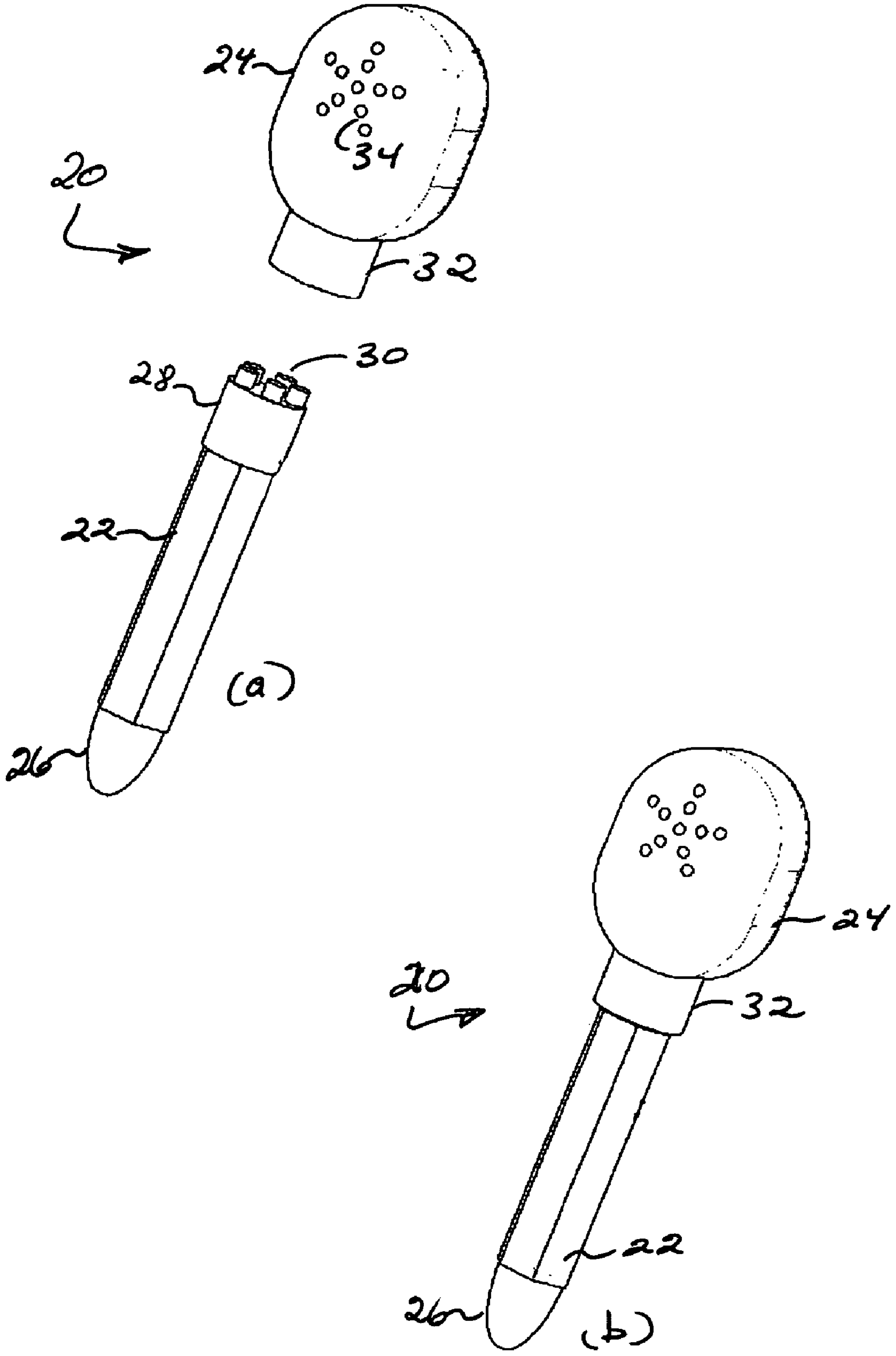
FIG. 1(*a*) is an exploded view of a crayon and sound emitting device assembly according to a first embodiment of the invention.

A first embodiment of a crayon and sound emitting device assembly is generally indicated by reference numeral 20 in FIGS. 1(*a*) and 1(*b*). The assembly 20 consists of a crayon 22 and sound emitting device 24. The crayon 22 has a distal marking end 26 remote from the sound emitting device 24 which is adapted to mark paper (not shown) with a particular colour, for example, red. The crayon 22 has an identifying termination 28 at an end opposite from the distal marking end 26 consisting of a plurality of projecting knobs 30. The identifying termination 28 is adapted to be received inside a socket 32 forming part of the sound emitting device 24 where the knobs 30 trigger a corresponding array of built in switches (not shown) inside the sound emitting device.

The sound emitting device 24 has a speaker 34 operatively connected to a microprocessor and an integrated circuit (not shown) which are housed inside the sound emitting device. The array of switches triggered by the identifying termination 28 operates to produce an audible message associated with the colour red which is transmitted through the speaker 34.

Figure 2:
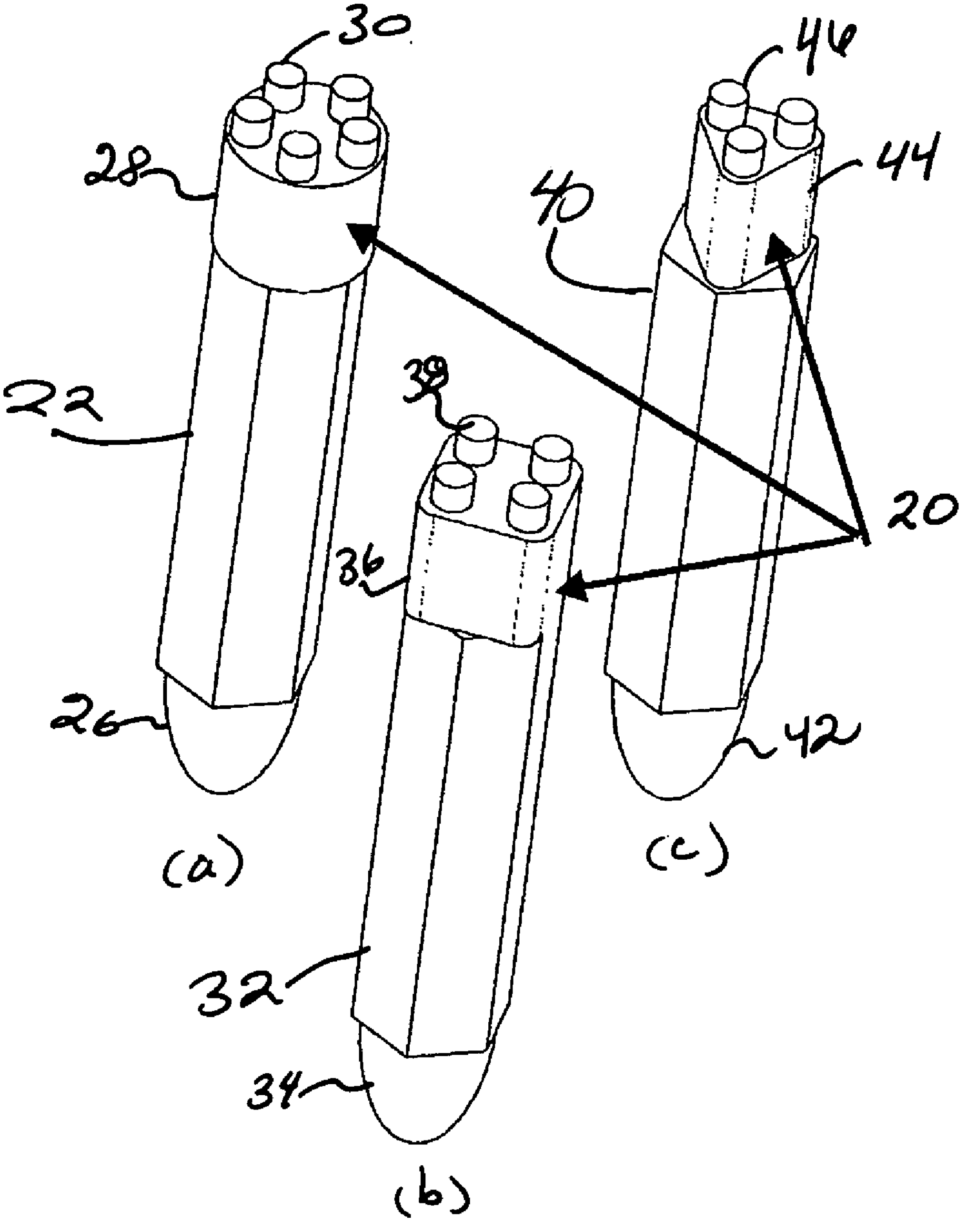
FIG. 2(*a*)(*b*)(*c*) is a perspective view of three crayons each having a respective identifying physical termination in accordance with a first embodiment of the invention.
Figure 3:
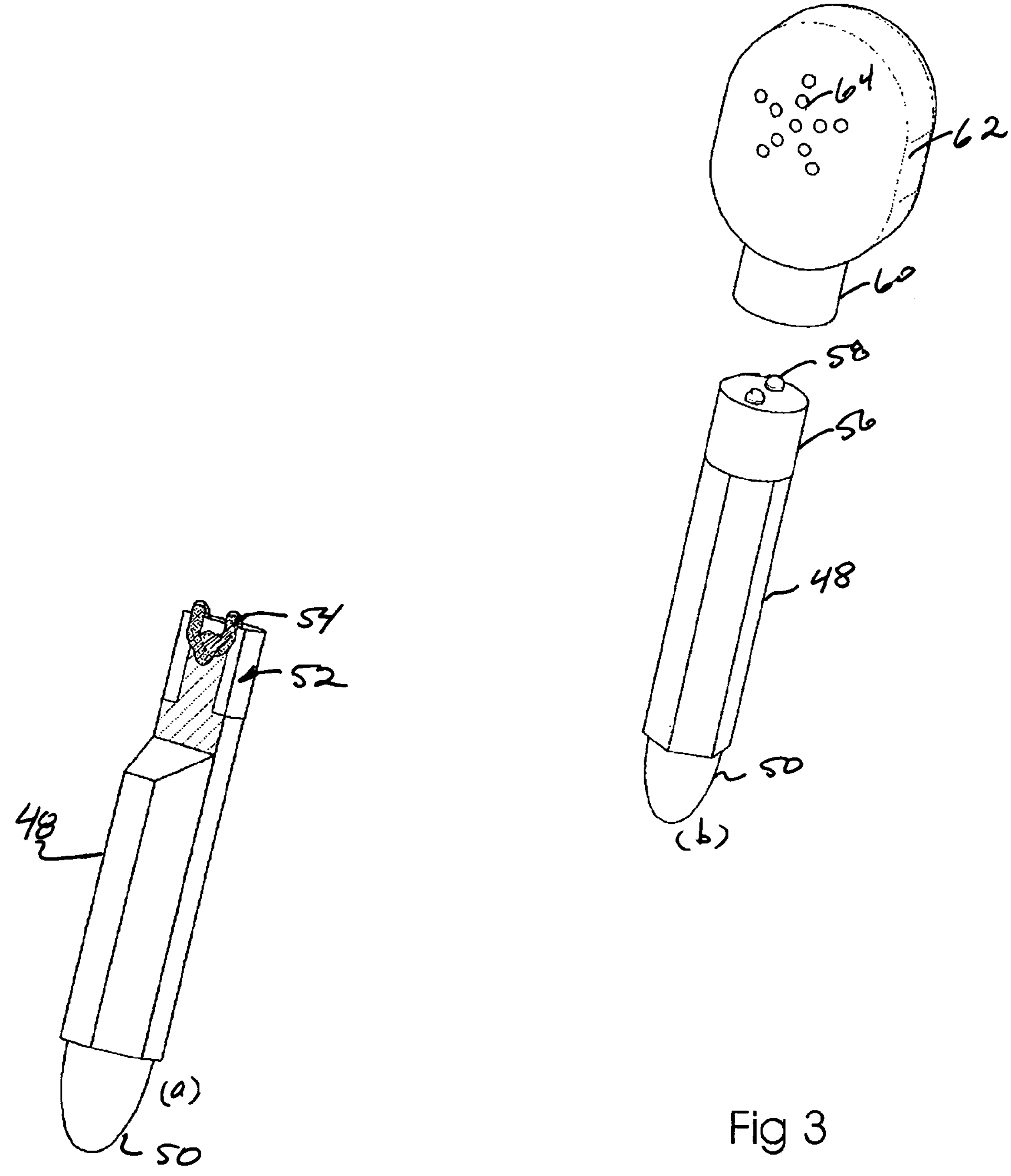
FIG. 3(*a*) is a perspective view of a crayon showing an identifying electrical termination in accordance with a second embodiment of the invention.

The identifying termination 28 of the crayon 22 of FIG. 1 has a round base supporting a circular array of five knobs 30 also shown in FIG. 2(*a*).

In FIG. 2(*b*), a crayon 32 having a distal marking end 34 adapted to mark paper (not shown) with the colour blue has an identifying termination 36 with a square base supporting a square array of four knobs 38.

In FIG. 2(*c*), a crayon 40 having a distal marking end 42 adapted to mark paper (not shown) with the colour yellow has an identifying termination 44 with a triangular base supporting a triangular array consisting of three knobs 46.

It will be understood that a universal sound emitting device 24 is physically coupled to a selected crayon and that the nature of the audible message which is transmitted through the speaker 34 is determined by the array of switches inside the sound emitting device 24 which is triggered by the particular identifying termination (28, 36, 44) of the crayon (22, 32, 40) which is being coupled to the sound emitting device 24.

The universal sound emitting device 24 may be moved from crayon to crayon or each crayon may be coupled to a respective sound emitting device. Optionally, the sound emitting device is integral with the crayon.

The cap 56 is dimensioned to be received in a socket 60 formed at one end of a sound emitting device 62 which houses a speaker 64, a microprocessor and an integrated circuit (not shown). The electrical contacts 58 close an electrical circuit inside the sound emitting device 62 which will produce a predefined audible sound according to the resistance of the electric resistance element 54 inside a crayon.

Figure 4:
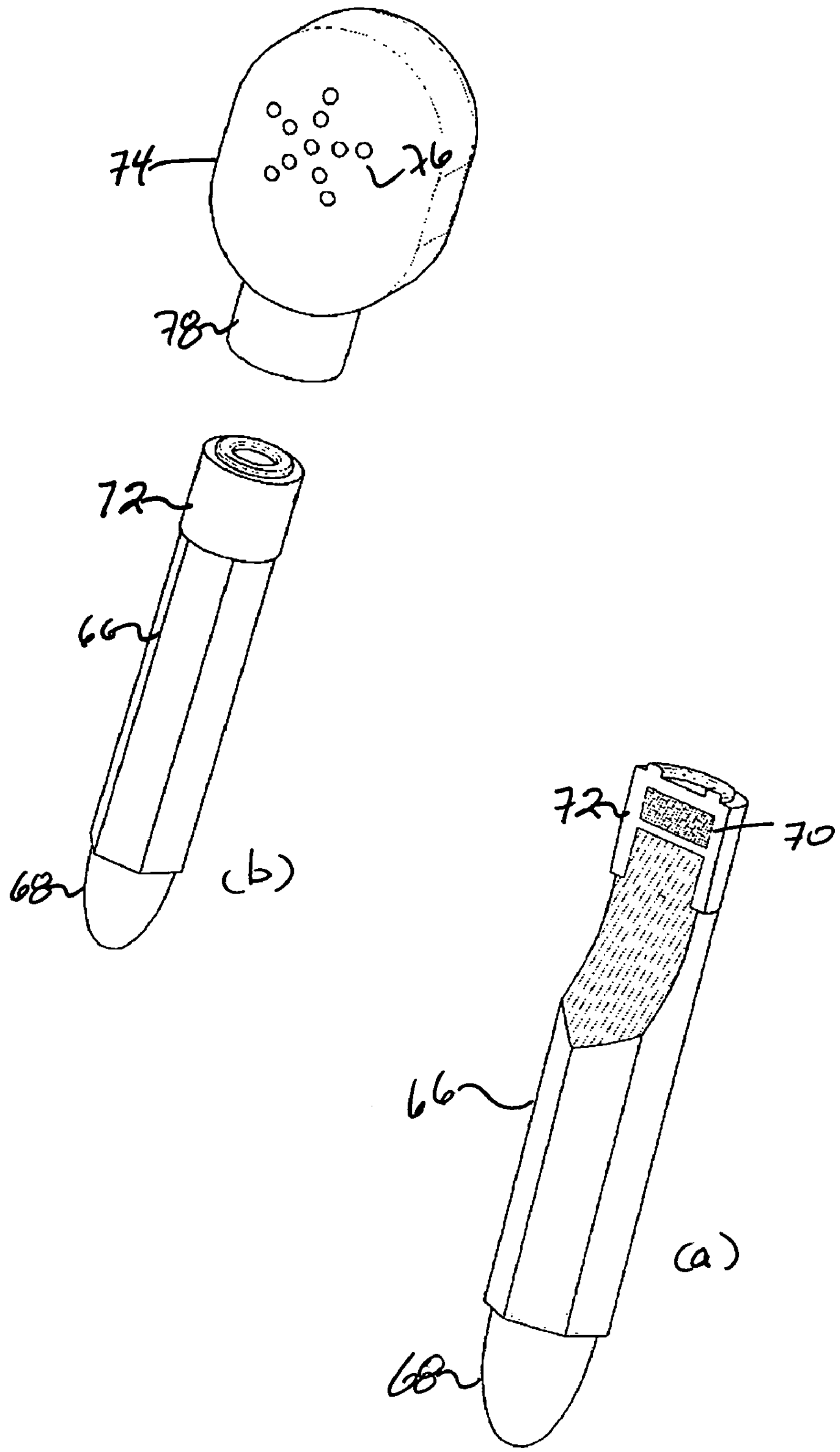
FIG. 4(*a*) is a partly sectioned perspective view of a crayon showing an identifying electromagnetic termination in accordance with a third embodiment of the invention.

In a third embodiment of the invention shown in FIGS. 4(*a*) and (*b*), a crayon 66 having a distal marking end 68 has an identifying termination 70 consisting of a microscopic wave generator which may be an electromagnetic coil or ultrasonic and which is unique to each crayon in a set. The microscopic wave generator is embedded in a plastics cap 72 which is fused to the crayon 66 and which communicates with a sound emitting device 74 which houses a speaker 76, a microprocessor and an integrated circuit (not shown).

Conveniently, the sound emitting device 74 has a socket termination 78 for receiving the identifying termination 70. However, the sound emitting device 74 may be activated without being physically coupled to the crayon 66.

The crayon assembly according to the invention is an educational fin toy which will teach young children how to spell and distinguish their colours. The talking "head" or sound emitting device responds when a crayon is inserted; its "brain" or microprocessor detects what colour it is, says and spells the name and gives an example of common objects normally of that colour. It then prompts the child to draw with that crayon. Preferably, each crayon set comes with one talking "head" and six colourful crayons (blue, green, orange, purple, red and yellow).

It will be understood that several variations may be made to the above-described embodiments of the invention as will be apparent to those skilled in the art.

The invention claimed is:

1. A set of crayons each having a respective physical property, each crayon having an identifying termination remote from a distal marking end, and a sound emitting device adapted to cooperate with said identifying termination and to generate an audible message corresponding to a physical property of the associated crayon, each crayon being coupled to a respective sound emitting device.

2. A set of crayons according to claim 1 in which the sound emitting device has a socket adapted to receive said identifying termination and includes a speaker.

* * * * *